US012506998B1

(12) United States Patent
Nelson et al.

(10) Patent No.: US 12,506,998 B1
(45) Date of Patent: Dec. 23, 2025

(54) HEADPHONE SYSTEM

(71) Applicant: LENOVO (SINGAPORE) PTE. LTD., Singapore (SG)

(72) Inventors: Lindsay Nelson, Morrisville, NC (US); Christopher Romano, Morrisville, NC (US); Russell T Covington, Morrisville, NC (US); Dane Hixson, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 228 days.

(21) Appl. No.: 18/226,521

(22) Filed: Jul. 26, 2023

(51) Int. Cl.
*H04R 1/10* (2006.01)
*H04R 1/04* (2006.01)
*H04R 5/033* (2006.01)

(52) U.S. Cl.
CPC ............ *H04R 1/1066* (2013.01); *H04R 1/04* (2013.01); *H04R 1/1008* (2013.01); *H04R 1/1016* (2013.01); *H04R 1/1041* (2013.01); *H04R 1/105* (2013.01); *H04R 5/0335* (2013.01); *H04R 2430/01* (2013.01); *H04R 2460/01* (2013.01)

(58) Field of Classification Search
CPC ...... H04R 1/1066; H04R 1/04; H04R 1/1008; H04R 1/1016; H04R 1/1041; H04R 1/105; H04R 5/0335; H04R 2430/01; H04R 2460/01; H04R 25/00; H04R 1/1075; H04R 1/1083; H04R 1/30; H04R 1/10; H04R 3/007; H04R 5/033; A61F 11/14
See application file for complete search history.

(56) References Cited

U.S. PATENT DOCUMENTS

| | | | | |
|---|---|---|---|---|
| 7,869,615 B2 * | 1/2011 | Chang | H04R 1/10 381/371 |
| 2010/0189277 A1 * | 7/2010 | Birgersson | A61F 11/14 381/73.1 |
| 2012/0020491 A1 * | 1/2012 | Dory | H04R 1/1041 381/74 |
| 2013/0156247 A1 * | 6/2013 | Boyajian | H04R 1/30 381/370 |
| 2014/0211959 A1 * | 7/2014 | Boyajian | H04R 5/033 381/74 |
| 2017/0208380 A1 * | 7/2017 | Slater | H04R 1/1083 |
| 2018/0324515 A1 * | 11/2018 | Boesen | H04R 1/1041 |
| 2021/0112327 A1 * | 4/2021 | Lu | H04R 1/1083 |
| 2022/0109923 A1 * | 4/2022 | Rajasekaran | H04R 1/1008 |
| 2023/0055191 A1 * | 2/2023 | Kang | H04R 3/007 |
| 2023/0300510 A1 * | 9/2023 | Chen | H04R 1/1075 381/74 |

FOREIGN PATENT DOCUMENTS

| | | | |
|---|---|---|---|
| WO | WO-2016148316 A1 * | 9/2016 | H04R 1/10 |

* cited by examiner

*Primary Examiner* — Angelica M McKinney
(74) *Attorney, Agent, or Firm* — Brian J. Pangrle

(57) ABSTRACT

A headphone system can include an earbud that includes an earbud speaker, earbud communication circuitry and earbud power circuitry; and a headphone that includes a headphone speaker, an ear cushion, a headband, headphone communication circuitry, headphone power circuitry and an earbud socket that removably receives the earbud.

20 Claims, 11 Drawing Sheets

HEADPHONE SYSTEM

TECHNICAL FIELD

Subject matter disclosed herein generally relates to a headphone or headphones.

BACKGROUND

A headphone system can include one or more headphone speakers, each optionally with a corresponding ear cushion, and a headband.

SUMMARY

A headphone system can include an earbud that includes an earbud speaker, earbud communication circuitry and earbud power circuitry; and a headphone that includes a headphone speaker, an ear cushion, a headband, headphone communication circuitry, headphone power circuitry and an earbud socket that removably receives the earbud. A method can include receiving a first audio signal by a headphone that includes an earbud socket; generating first acoustic waves responsive to receipt of the first audio signal; receiving a second audio signal by an earbud disposed in the earbud socket; and generating second acoustic waves responsive to receipt of the second audio signal. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
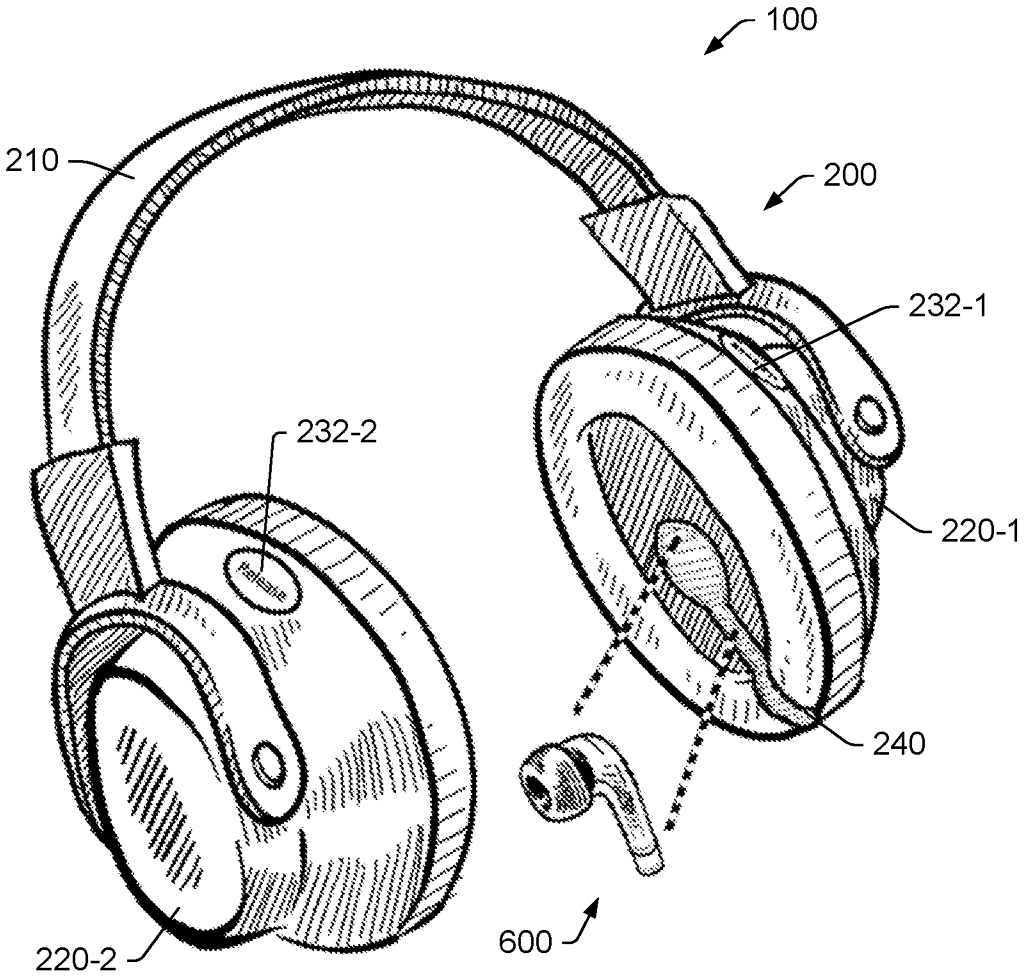
FIG. 1 is a diagram of an example of a headphone system.

FIG. 1 shows an example of a headphone system 100 that includes headphones 200 and an earbud 600. As shown in FIG. 1, the headphones 200 includes a headband 210 and left ear and right ear assemblies 220-1 and 220-2 that are coupled to the headband 210. In the example of FIG. 1, the earbud 600 is shown as a single earbud, noting that the headphone system 100 can include one or more earbuds. For example, each of the assemblies 220-1 and 220-2 may include an earbud socket 240 that can receive an earbud such as an ambidextrous earbud, a left earbud or a right earbud; noting that a single assembly may receive two earbuds.

As an example, the headphone system 100 can include one or more earbud release mechanisms. For example, the assembly 220-1 is shown as including a release button 232-1 and the assembly 220-2 is shown as including a release button 232-2. As an example, the release button 232-1 may be actuated by a finger of a hand and/or by a signal such that the earbud 600 is released from the earbud socket 240 of the assembly 220-1. While the example of FIG. 1 shows the release buttons 232-1 and 232-1, the earbud 600 may be set into the earbud socket 240 in a manner whereby it can be manually removed without use of a release mechanism. For example, a portion of the earbud 600 may be accessible via a finger (e.g., a fingernail), fingers, etc., whereby force can be applied to the earbud 600 to move it out of the earbud socket 240.

Individuals such as gamers frequently use two headsets or listening devices while engaged in activities. For example, a user may connect a set of headphones to their gaming device and have a second headset used for communication with friends or teammates using one or more communication technologies. For example, consider the DISCORD communication technology, which is a VoIP and instant messaging social platform. Through DISCORD, users have the ability to communicate with voice calls, video calls, text messaging, media and files in private chats or as part of communities called "servers", where a server is a collection of persistent chat rooms and voice channels which can be accessed via invite links.

In various scenarios, the use of two separate audio devices can be bulky, uncomfortable, and awkward to manage, and audio from one may be blocked in an ear if the other device is an earbud-type device. Simultaneous use of multiple audio devices such as, for example, a headset and earbuds, with one in each ear, can give rise to various types of issues. While earbuds may amplify ambient outside sounds, allowing users to hear their surroundings, this does not necessarily solve the issue of comfort or functionality of receiving audio feeds from two different sources.

As shown in the example of FIG. 1, the headphone system 100 can include one or more assemblies that can accommodate one or more earbuds. For example, a headphone system can include an earbud socket that allows for a snapping-in an earbud and/or snapping-out an earbud, which may be via one or more magnets, mechanics, etc. An earbud socket may be in a mounting zone of a cavity of an ear assembly (e.g., a right ear assembly or a left ear assembly) of a headphone system.

As an example, a headphone system can include circuitry that can provide for charging of one or more earbuds, controlling one or more earbuds, etc. As an example, a headphone system can provide electrical power to one or more earbuds via wired circuitry and/or via a wireless circuitry. As an example, an earbud may engage its own ambient sound technology to allow sounds from an encasing headphone to be heard by a wearer.

As an example, a headphone system can include an earbud that includes an earbud speaker, earbud communication circuitry and earbud power circuitry; and a headphone that includes a headphone speaker, an ear cushion, a headband, headphone communication circuitry, headphone power circuitry and an earbud socket that removably receives the earbud.

Figure 2:
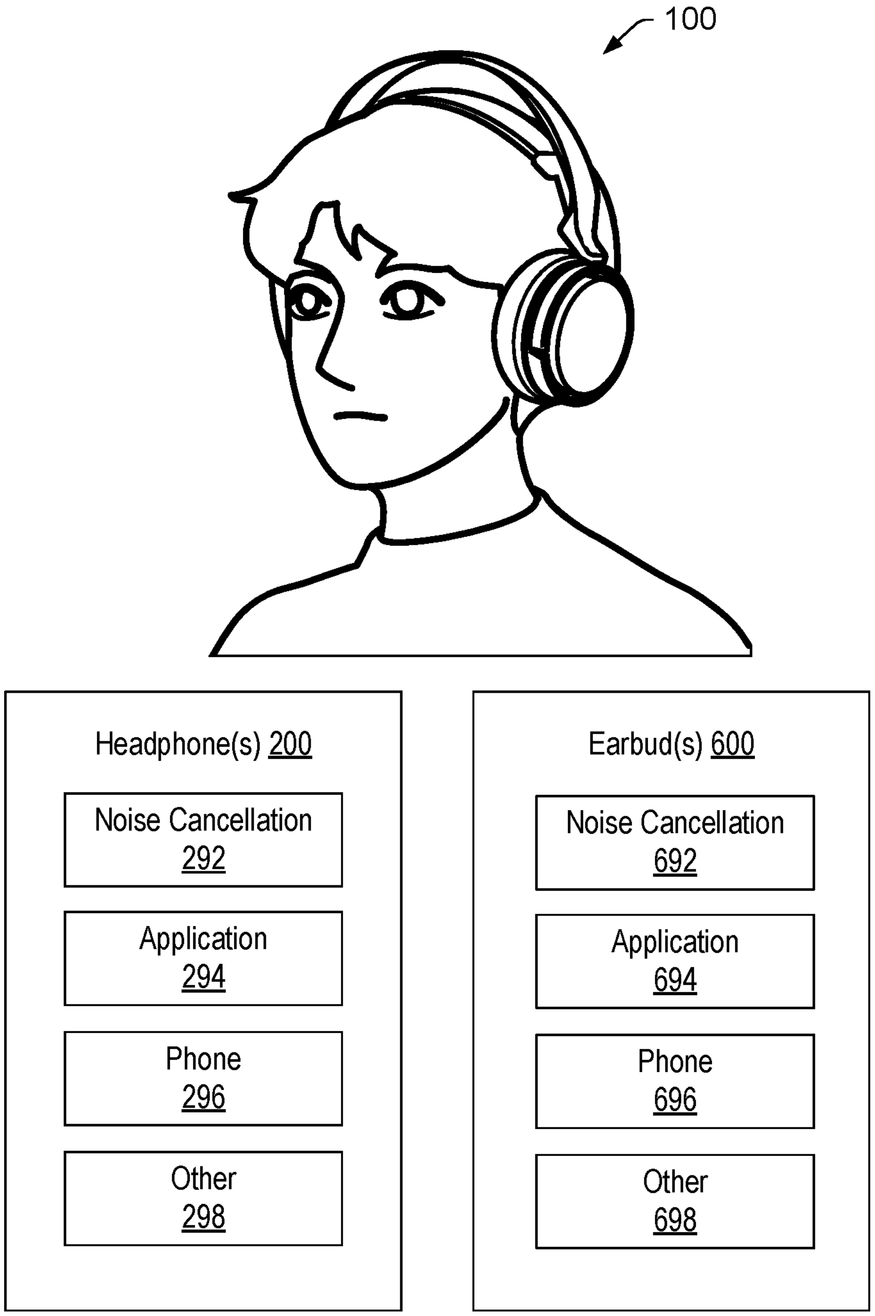
FIG. 2 is a diagram of an example of a headphone system along with a block diagram of examples of functions.

FIG. 2 shows an example of the headphone system 100 as worn on a head of a user. In the example of FIG. 2, the headphones 200 can include circuitry such as circuitry for noise cancellation 292, application interaction 294, phone interaction 296 and/or one or more other features 298. In the example of FIG. 2, the earbud 600 can include circuitry such as circuitry for noise cancellation 692, application interaction 694, phone interaction 696 and/or one or more other features 698.

As an example, the headphone system 100 may mediate audio signals such that a user wearing the headphone system 100 hears audio from one or more sources in a selective and controlled manner. For example, consider control logic that determines how audio is rendered using one or more speakers of the headphone system 100. In such an example, the control logic can receive a signal from a phone (e.g., a cellular phone, etc.) that is from a phone paired with the earbud 600 whereby upon receipt of the signal, the control logic reduces volume of audio rendered by one or both of the ear assemblies 220-1 and 220-2. In such an example, a microphone of the earbud 600 may be available for receipt of vocal utterances by the user such that the user can participate in a phone call. As an example, the headphone system 100 may include one or more microphones, which can include one or more ear assembly microphones. While the phone call example prioritizes the phone call for a phone paired with the earbud 600 over audio rendered by one or more of the ear assemblies 220-1 and 220-2, control logic may prioritize a phone call for a phone paired with the headphones 200. As explained with respect to FIG. 2, the headphones 200 can include various types of circuitry for various functions and the earbud 600 can include various types of circuitry for various functions. In such an example, control logic may be programmable or otherwise controllable to prioritize one or more functions over one or more other functions or, for example, to allow for multiple functions to be performed at the same time, as may be desirable for a user.

As an example, a user may setup a headphone system for purposes of noise cancellation, which may aim to cancel ambient noise. For example, consider headphones operating to cancel ambient noise while one or more earbuds deliver audio.

Figure 3:
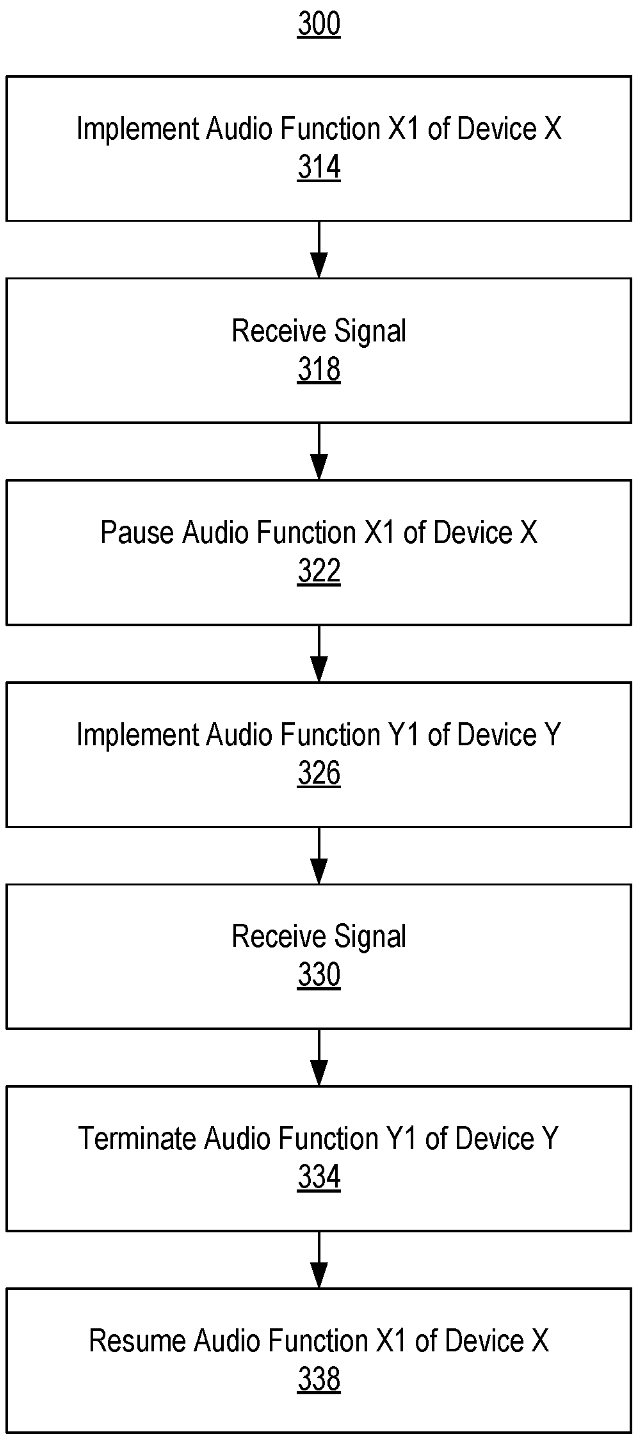
FIG. 3 is a diagram of an example of a method.

FIG. 3 shows an example of a method 300 that includes an implementation block 314 for implementing an audio function X1 of a device X, a reception block 318 for receiving a signal, a pause block 322 for pausing the audio function X1 of the device X responsive to the signal, an implementation block 326 for implementing an audio function Y1 of a device Y, a reception block 330 for receiving a signal, a termination block 334 for terminating the audio function Y1 of the device Y1 responsive to the signal, and a resume block 338 for resuming the audio function X1 of the device X after the terminating of the block 334.

The method 300 of FIG. 3 can be a method for mediating various functions, for example, using control logic for a headphone system such as, for example, the headphone system 100.

As an example, a headphone system when fitted with one or more earbuds can include multiple instances of wireless communication circuitry such as, for example, BLUETOOTH circuitry whereby a headphones can pair to one device and an earbud or earbuds can pair to another device. As an example, a headphone system may be fitted with two earbuds where each of the two earbuds is independent of the other. For example, consider a user that has two sets of earbuds, a first set and a second set. In such an example, one of the earbuds from the first set may be fit into a first earbud socket of a headphones and one of the earbuds from the second set may be fit into a second earbud socket of the headphones. In such an example, there may be three different instances of wireless communication circuitry such that the headphone system can interact with three devices (e.g., consider two phones and one gaming application). Such an approach can include control logic that can mediate functions of a first earbud, a second earbud and the headphones. Such control logic can provide for mediating a multitude of scenarios that may arise, whether related to phone calls, gaming, noise cancellation, etc.

Figure 4:
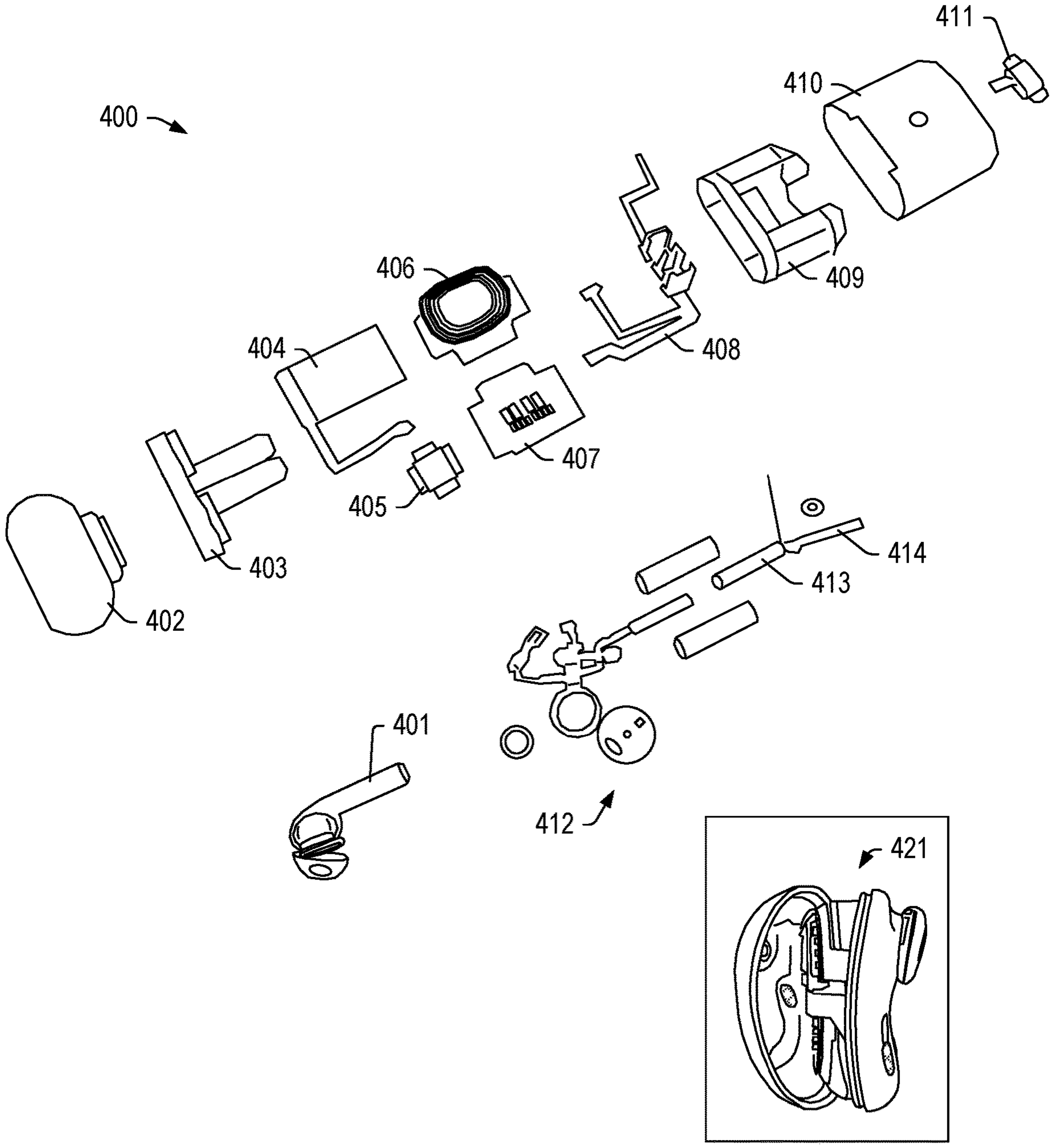
FIG. 4 is a diagram of an example of an earbuds assembly.

FIG. 4 shows an exploded view of an example of an earbuds assembly 400, which may be a portable assembly such that a user can transport earbuds and charge the earbuds. Specifically, FIG. 4 shows the earbuds assembly 400 as including an earbud 401 (partially opened), a case flip top 402, a case earbud dock 403, a case battery 404, a synchronization button 405, a case wireless charging coil 406 (e.g., an antenna), a case circuitry board 407, a case cable 408, a case inner assembly 409, a case housing 410, a case charging port 411, an earbud sub-assembly 412 (e.g., including a speaker driver (e.g., a speaker), sensors, and circuitry board), an earbud rechargeable battery 413, and an earbud antenna 414. The earbuds assembly 400 can include two earbuds that can be received by a case. FIG. 4 also shows another example of an ear bud 421, which includes a speaker driver and various circuitry. As shown, an earbud can have a shape where a portion of the ear bud can be disposed in an ear of a user.

An earbud may sit in the outer ear and create a loose seal or a tight seal with the ear. A loose seal may provide a relatively low isolation from outside noise while a tight seal may exclude more outside noise. As an example, an earbud may be an in-ear monitor (IEM), which can have an ear tip that forms a seal with the ear canal. An ear tip may be referred to as an ear nub, an ear bit, an insert, a fitting, etc., which can determine sound quality, comfort, isolation, and fit security. An earbud driver (e.g., speaker driver) can be, for example, a dynamic driver or a balanced armature driver.

An ear tip can be a shaped interface part that contacts an ear, for example, that contacts a wall of an ear canal. An ear tip may be made of a resilient material or a rigid material. A resilient material can aim to form to a user's ear canal at least in part through deformation of the resilient material; whereas, a rigid material may be angle, depth controlled, etc., to achieve a desired fit. As an example, an earbud may be bendable, foldable, hinged, etc. For example, consider an earbud that can be in a folded, compact position and transitioned to an unfolded, use position. In such an example, the folded, compact position may result in a smaller size for purposes of storage.

As an example, an earbud may include one or more features of an APPLE AIRPODS earbud, a SAMSUNG GALAXY BUDS earbud, a SONY earbud, an ANKER earbud, a JABRA earbud, a BOSE earbud, a SKULLCANDY earbud, a B&O earbud, etc. As an example, features of an assembly can include BLUETOOTH circuitry, personal assistant circuitry, one or more microphones, etc.

As an example, the first generation AIRPODS earbuds are approximately 4 g each, where a charging case for the earbuds is approximately 38 g. As to dimensions, each earbud is approximately 16.5 mm by 18.0 mm by 40.5 mm and the charging case is approximately 44.3 mm by 21.3 mm by 53.5 mm. The AIRPODS earbuds include BLUETOOTH circuitry and the charging case includes a LIGHTENING connector. As to sensors, each of the earbuds includes dual beamforming microphones, dual optical sensors, a motion-detecting accelerometer, and a speech-detecting accelerometer.

As an example, a headphone system such as the headphone system 100 can include one or more features of the earbuds assembly 400 of FIG. 4 where one or more earbuds can include one or more features of the earbud 401 of FIG. 4. As an example, a headphone system 100 may be a storage system for storing one or more earbuds, where, in a storage mode, the one or more earbuds may optionally be transitioned to an active mode, for example, responsive to one or more types of signals (e.g., from a user, from a device, etc.).

Figure 5:
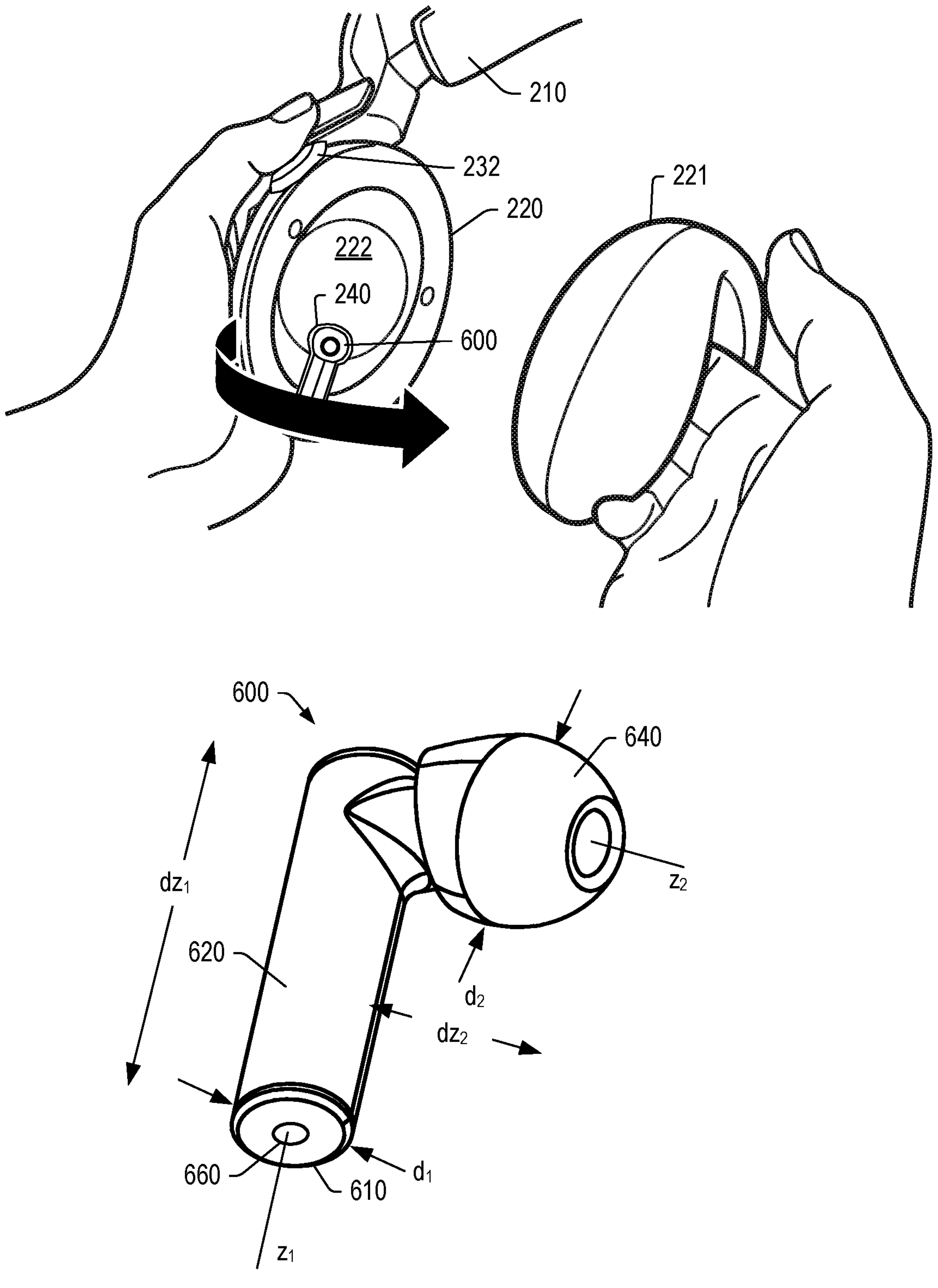
FIG. 5 is a series of diagrams of an example of a portion of a headphone system and an example of an earbud.

FIG. 5 shows an example of a portion of the headphone system 100 where an ear cushion 221 is removed to expose a portion of the assembly 220. As shown, the assembly 220 includes a speaker 222 and the earbud socket 240 that can receive the earbud 600. As shown, the earbud 600 can include a bottom 610, a stem 620, and a plug 640 with an opening for audio emissions. In the example of FIG. 5, the earbud 600 can include an opening 660 for a microphone.

In various examples, one or more coordinate systems may be utilized to define one or more features of a headphone system. For example, FIG. 5 shows an axis $z_1$ of the stem 620 along with a diameter $d_1$ and an axial length $dz_1$, where, for example, the plug 640 may be defined via an axis $z_2$, a diameter $d_2$ and an axial length $dz_2$. Such dimensions may be utilized to dimension a socket such as, for example, the earbud socket 240. As shown, the earbud 600 can be fit into the earbud socket 240 where an end of the stem 620 can be exposed or facing an opening of the assembly 220. In such an example, the opening 660 may be a microphone opening that can sense sound waves (e.g., acoustic waves) in an external environment (e.g., from the voice of a wearer of the headphone system 100).

Figure 6:
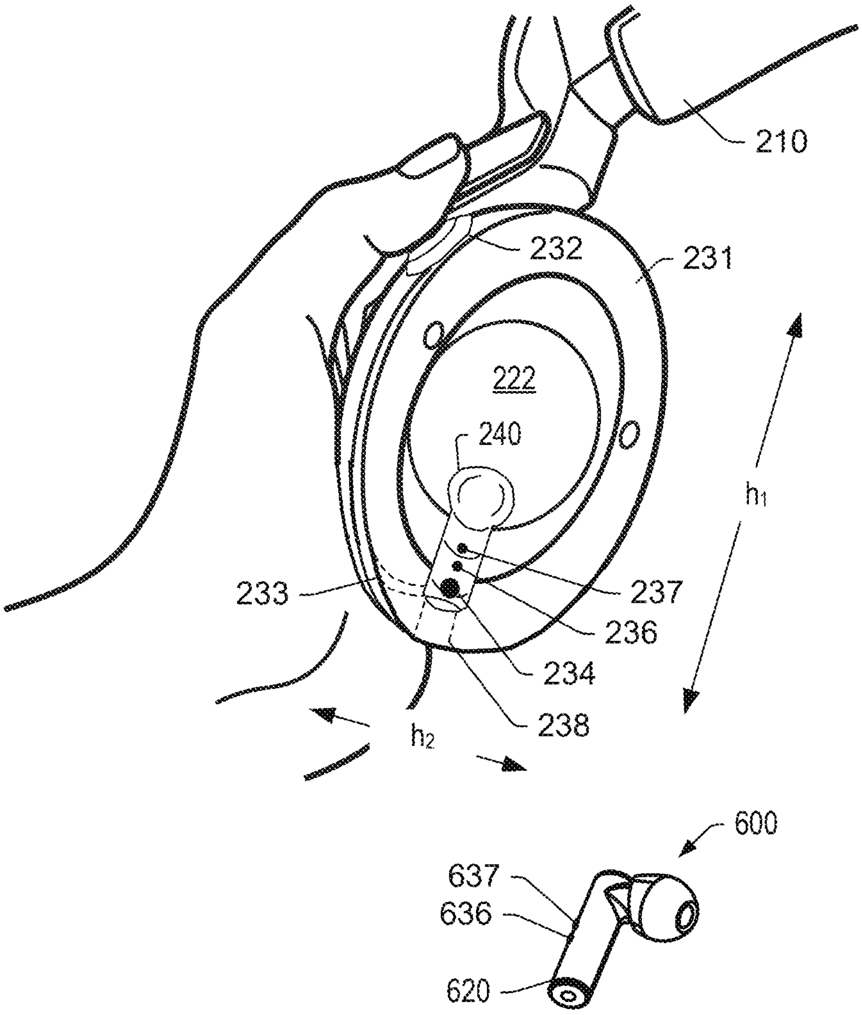
FIG. 6 is a diagram of an example of a portion of a headphone system.

FIG. 6 shows an example of a portion of the headphone system 100 where the earbud socket 240 does not have the example earbud 600 seated therein. Further, the release button 232 is shown as being operatively coupled via a linkage 233 to a releasing mechanism 234, which, as mentioned, may be magnetic, electromagnetic, mechanical, etc. Additionally, the earbud socket 240 includes one or more electrical contacts 236 and 237, which may mate with one or more corresponding electrical contacts 636 and 637 of the earbud 600, noting that a wired and/or wireless approach may be utilized for interactions between an earbud and the headphones 200. The example of FIG. 6 also shows a passage 238 that may be a microphone passage such that an earbud seated in the earbud socket 240 can receive audio waves (e.g., vocal utterances, etc.).

As explained, one or more coordinate systems may be utilized to define one or more features of a headphone system. In the example of FIG. 6, a shell 231 of an assembly (e.g., the assembly 220, etc.), can be defined using lengths $h_1$ and $h_2$, which may be lengths of major and minor axes of an ellipse or another oval type of shape. As shown, the earbud socket 240 may be aligned substantially along an axis of the shell 231. In the example of FIG. 6, the speaker 222 is located in a substantially centered manner within the shell 231, which may be a body formed of one or more pieces of material. As an example, a portion of an earbud and/or an earbud socket may extend in part over a speaker such that the portion may be disposed between the speaker and an ear of a wearer.

Figure 7:
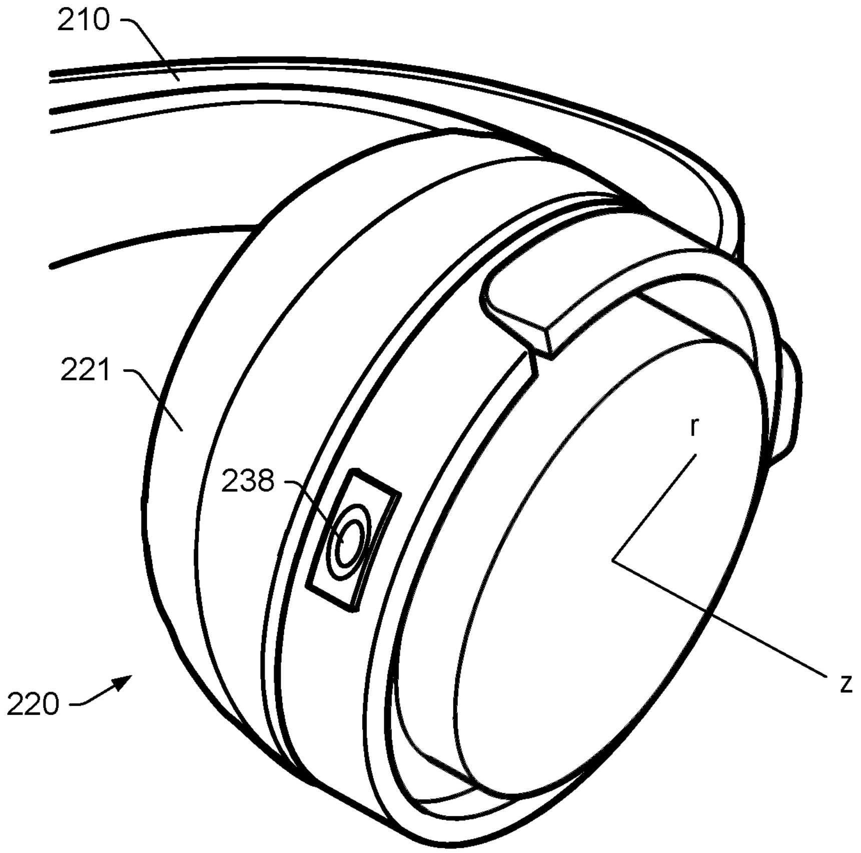
FIG. 7 is a diagram of an example of a portion of a headphone system.

FIG. 7 shows an example of a portion of the headphone system 100 where the passage 238 is visible as extending to an outer surface of the ear assembly 220. In such an approach, a microphone of an earbud may still be utilized even when the earbud is received in the earbud socket 240 of the ear assembly 220. As an example, the ear assembly 220 may have another passage for another microphone, which may be an integrated microphone of the ear assembly 220 that is operable whether or not an earbud is received in the earbud socket 240.

As an example, a cylindrical coordinate system or an ellipsoidal coordinate system may be utilized to define an assembly of a headphone system, particularly a portion that fits over an ear of a wearer. For example, in FIG. 7, a z-axis and an r-coordinate are shown where, for example, a theta angle may be measured in a clockwise direction about the z-axis. In such an approach, the passage 238 may be defined as being at a radial position and at a theta angle in cylindrical coordinate system (e.g., or an ellipsoidal coordinate system with major and minor axes, etc.).

Figure 8:
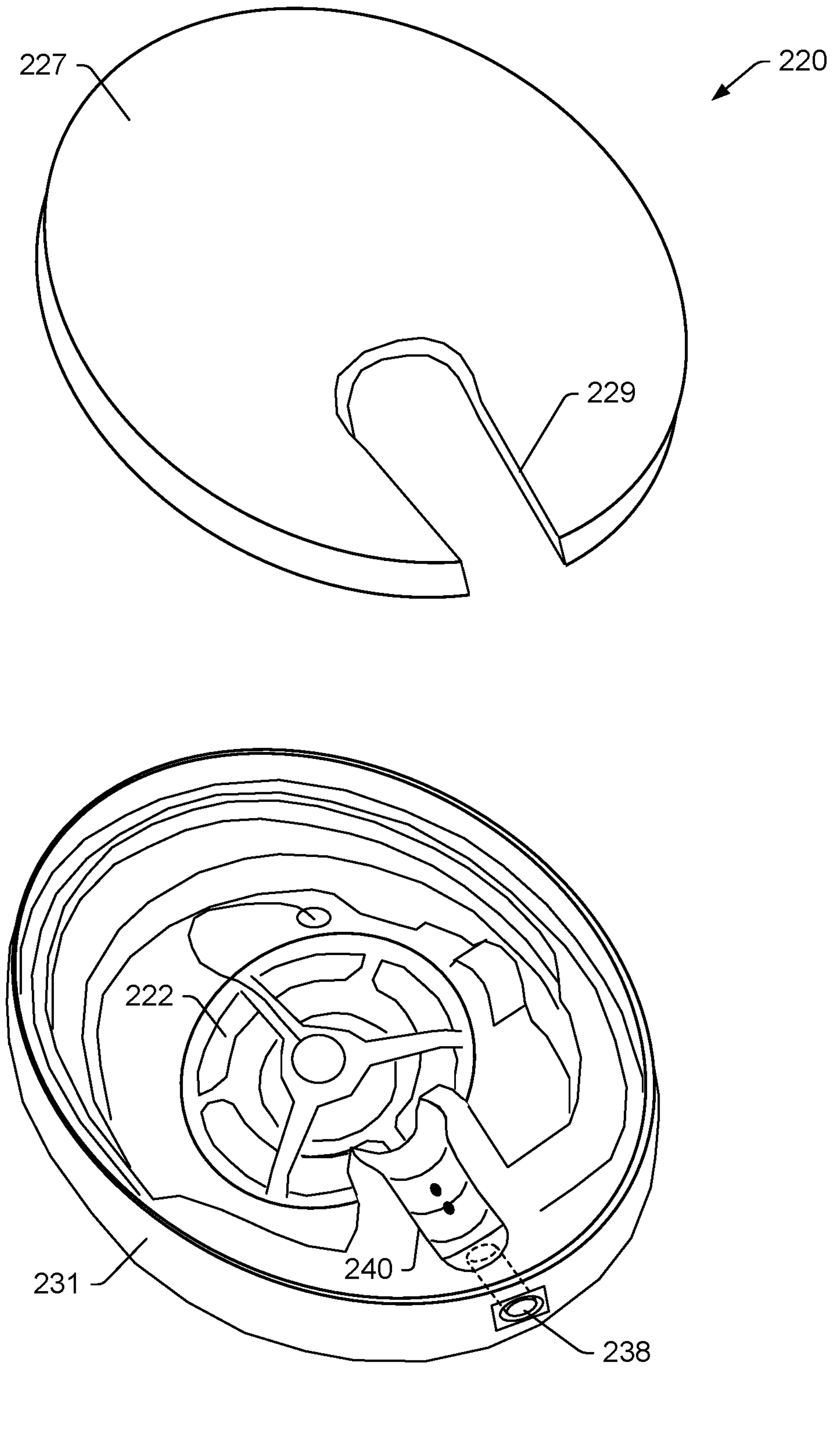
FIG. 8 is a diagram of an example of a portion of a headphone system.

FIG. 8 shows an example of a portion of the ear assembly 220 that includes a shell 231 as may be formed of a suitable material or materials (e.g., polymeric, metallic, etc.), where the speaker 222 is carried by the shell 231 and where the shell 231 has formed therein the earbud socket 240, optionally along with the passage 238 (e.g., as a microphone passage). In the example of FIG. 8, the ear assembly 220 also includes a piece of foam 227 that can include a recessed or cutout portion 229 that can accommodate at least a portion of an earbud when the earbud is received in the earbud socket 240. As an example, the foam 227 can help to protect the speaker 222 from debris, etc., while also allowing for audio to be transmitted from an earbud seated in the earbud socket 240 to an ear of a wearer. While the foam 227 is shown as including the recessed or cutout portion 229 as a cut through, it may include a suitable layer (e.g., thinner) of foam such that more protection is provided for the speaker 222. In such an example, removable of an earbud from the earbud socket 240 may involve removable of the foam 227 from the shell 231. As explained, a cushion can be provided, which, in the example of FIG. 8, may be positioned at least partially over the foam 227. In the example of FIG. 8, one or more coordinate systems may be utilized to describe one or more features (see, e.g., the coordinate systems of FIG. 5, FIG. 6, FIG. 7, etc.). For example, consider a coordinate system that may include a major axis and a minor axis in a plane with another axis normal to the plane, a cylindrical coordinate system, a Cartesian coordinate system, a spherical coordinate system, etc.

Figure 9:
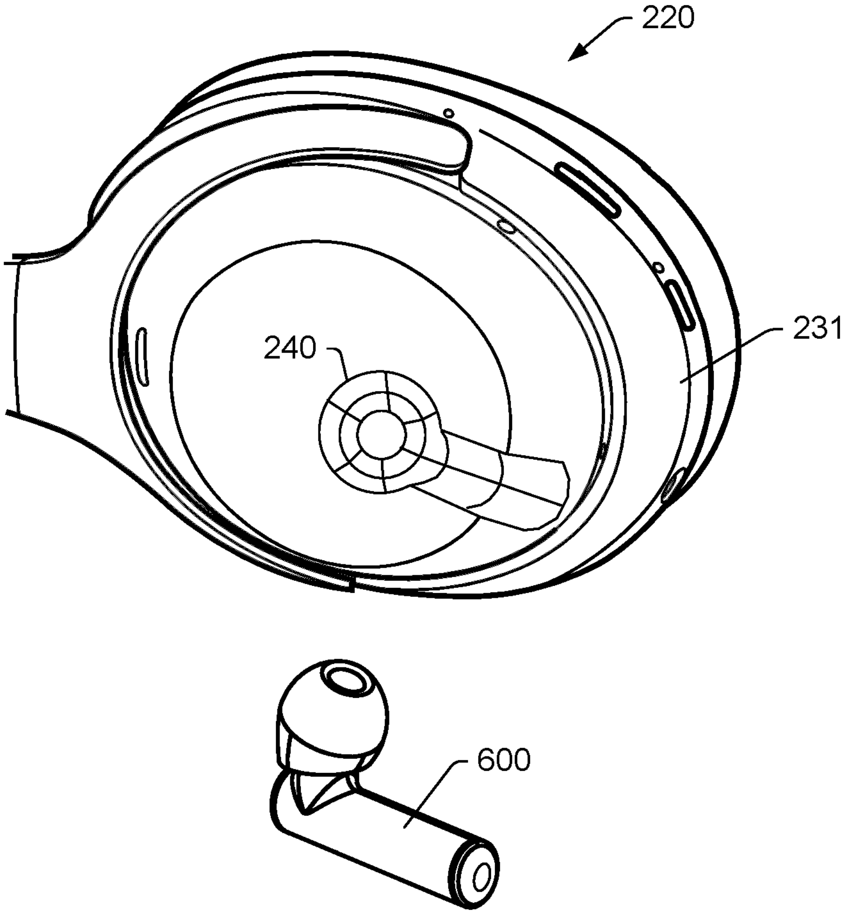
FIG. 9 is a diagram of an example of a portion of a headphone system.

FIG. 9 shows another example of the ear assembly 220 where the earbud socket 240 is accessible from an outer surface of the shell 231 that is not intended to face an ear of a user. In the example of FIG. 9, the earbud 600 may be received by the earbud socket 240 whereby a microphone of the earbud 600 remains available to receive audio waves. For example, the earbud 600 may fit into the earbud socket 240 via an interference fit where the bottom 610 of the earbud 600 is exposed along with the opening 660. As an example, the earbud 600 may be interference fit, magnetically fit, or otherwise fit into the socket 240, which may include one or more electrical contacts, noting that wireless interaction for power and/or signals may be provided via appropriate circuitry (e.g., one or more antennas, etc.). As an example, one or more coordinate systems may be utilized to define one or more features of the example assembly 220 and/or the example earbud 600 of FIG. 9.

As an example, a headphone system can include one or more features of the SONY WH-1000XM4 headphones. For example, consider headphones that are of a closed dynamic type, with a speaker (driver unit) of approximately 40 mm of a dome type (e.g., with a copper-clad aluminum wire (CCAW) voice coil), a neodymium magnet and an aluminum coated liquid crystal polymer (LCP) diaphragm. In such an example, the speaker may have a frequency response in a range from 4 Hz to 40,000 Hz, which may in operation depend on one or more types of communication technology (e.g., 20 Hz-20,000 Hz (44.1 KHz Sampling) or 20 Hz-40,000 Hz (LDAC 96 kHz Sampling, 990 kbps)).

As an example, a headphone system may be corded or cordless and may include one or more connectors that can be utilized with a corded cable (e.g., USB, etc.). As an example, a headphone system can include near-field communication (NFC) circuitry. As an example, a headphone system may provide for passive operation (e.g., consider plugging into a device).

A headphone system can include one or more batteries, which can include one or more rechargeable batteries. For example, consider a battery with a fully charged on time of at least 2 hours or more (e.g., consider a 10 hour, 20 hour, 30 hour, etc., on time).

As to wireless communication, consider BLUETOOTH circuitry with a line-of-sight range of approximately 10 meters and a frequency range in the 2.4 GHz band (2.4000 GHz-2.4835 GHZ).

As an example, a headphone system can include one or more types of audio circuitry, for example, to render one or more types of profiles, audio formats, etc. As an example, a headphone system can include content protection circuitry for rendering protected audio content.

As an example, a headphone system can include one or more user interfaces, which may include one or more touch-sensitive user interfaces. For example, consider a touch sensitive interface that can provide for volume control, logic control (e.g., for control logic), etc.

As an example, a headphone system can include one or more processors, which may be in the form of a chip, an integrated circuit, a system on a chip (SoC), etc. For example, consider a BLUETOOTH SoC (e.g., MEDIATEK MT2811), a memory chip (e.g., Q128JWYIQ memory chip), a low power FPGA and sensor management chip (e.g., LATTICE ice40ul1k low power FPGA and sensor manager), a processing chip (e.g., ARM CORTEX-MO+STM32LO microcontroller IC 32-bit single-core 32 MHz 192 KB (192K×8) FLASH 48-LQFP (7×7)), and a digital signal processing (DSP) chip (e.g., CIRRUS LOGIG CS48L32 with a 24-bit audio processor with 104 dB signal-to-noise ratio (SNR) mic input (16 kHz) and supports for up to four analog or four digital microphone (DMIC) inputs). As an example, such circuitry may be included in one or more portions of a headphone system such as, for example, one or more ear assemblies, a headband, etc.

Figure 10:
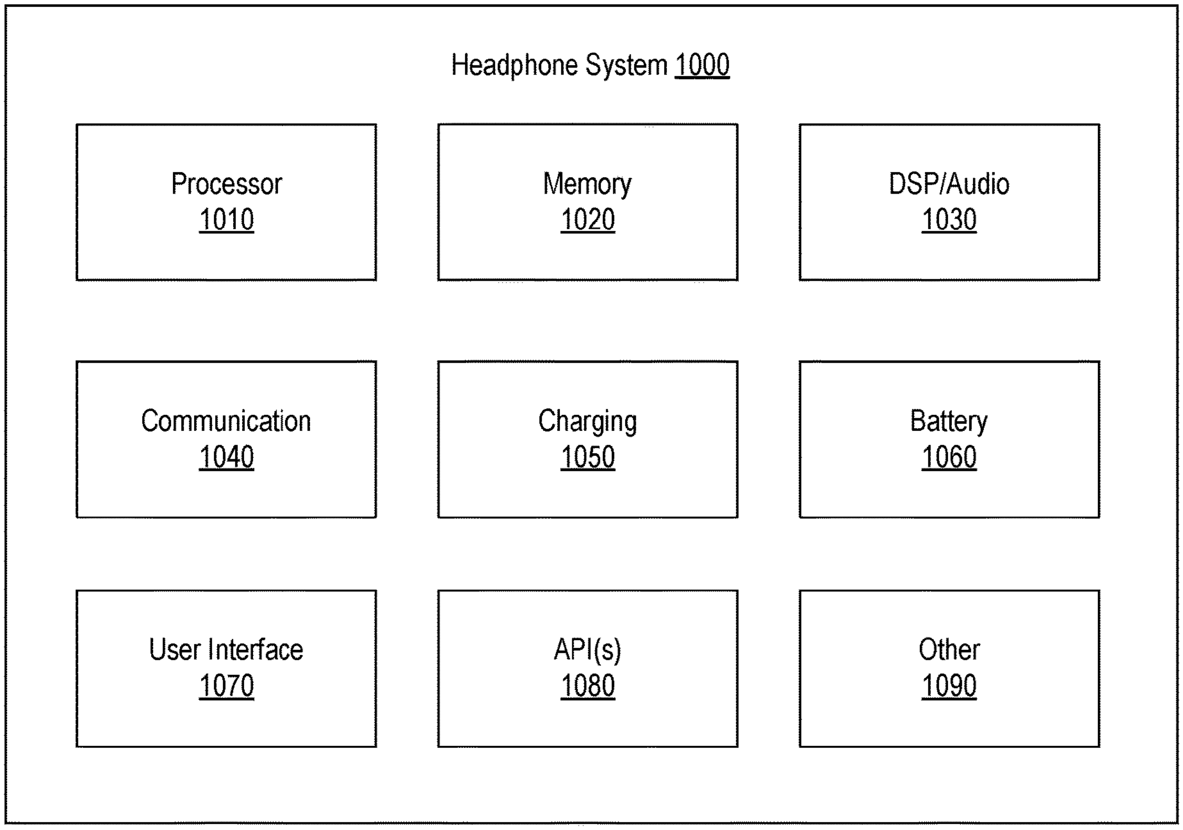
FIG. 10 is a block diagram of examples of circuitry of a headphone system.

FIG. 10 shows various examples of circuitry of a headphone system 1000, which can include one or more processors 1010, memory 1020, DSP/audio circuitry 1030, communication circuitry 1040, charging circuitry 1050, one or more batteries 1060, one or more user interface circuitry 1070, one or more instances of application programming interface (API) circuitry 1080 and one or more other types of circuitry 1090.

As an example, a software development kit (SDK) can provide for interactions with and/or control of a headphone system. For example, consider a game application that can include one or more API calls that can be implemented to control function of a headphone system. In such an example, consider a game application where an individual in the game makes a call to the gamer (e.g., user) where the call can be routed to an earbud or earbuds to mimic the action of the gamer receiving a call when using the headphone system. As an other example, consider a game application where an API call can be made to cause rendering of audio via an earbud or earbuds while other audio is rendered via one or more headphone speakers. In such an example, the rendering of audio via the earbud or earbuds may be like a secret call or a close-by individual whispering information into the ear of the gamer. Accordingly, through use of an SDK and/or one or more APIs, various features of a headphone system may be leveraged to enhance a game application and user experience.

As an example, a headphone system can include an earbud that includes an earbud speaker, earbud communication circuitry and earbud power circuitry; and a headphone that includes a headphone speaker, an ear cushion, a headband, headphone communication circuitry, headphone power circuitry and an earbud socket that removably receives the earbud.

As an example, a headphone system of can include earbud power circuitry that includes an electrical power reception contact and where an earbud socket includes an electrical power transmission contact that mates with the electrical power reception contact where the earbud is received in the earbud socket.

As an example, an earbud may be a right ear earbud or a left ear earbud and, for example, a headphone may be an ambidextrous headphone.

As an example, a headphone system can include an earbud that is a right ear earbud or a left ear earbud where the headphone includes a left ear headphone or a right ear headphone.

As an example, a headphone system can include an earbud that is a left ear earbud and further include a right ear earbud, where an earbud socket removably receives one or more of the left ear earbud and the right ear earbud. For example, consider a dual earbud socket and/or an ambidextrous earbud socket that has a shape suitable for receiving a left earbud or a right earbud.

As an example, a headphone system can include an earbud that is a first earbud and further include a second earbud where the headphone system can include a first headphone and a second headphone, where the first and the second headphones are coupled to a headband of the headphone system. In such an example, each of the headphones can include a respective earbud socket (e.g., a first earbud socket and a second earbud socket).

As an example, a headphone system can include headphone communication circuitry and earbud communication circuitry that are independently operable to receive earbud audio signals and headphone audio signals.

As an example, a headphone system can include an earbud that includes earbud volume control circuitry where a headphone of the headphone system includes headphone volume control circuitry.

As an example, a headphone system can include an earbud that includes earbud audio canceling circuitry actuatable to cancel audio emitted by a headphone speaker of a headphone of the headphone system. In such an example, the earbud audio canceling circuitry can be actuatable responsive to a call signal from a cellular communication device (e.g., a caller trying to reach a wearer of the headphone system).

As an example, a headphone system can include a headphone that includes headphone audio canceling circuitry actuatable to cancel audio emitted by an earbud speaker of an earbud of the headphone system.

As an example, a headphone system can include an earbud that includes an earbud microphone. In such an example, an earbud socket of a headphone of the headphone system can removably receive the earbud to acoustically isolate the earbud microphone from the earbud speaker. In such an example, the earbud socket can removably receive the earbud to acoustically isolate the earbud microphone from a headphone speaker of the headphone of the headphone system.

As an example, a headphone system can include a headphone that includes a mute control actuatable to mute one or more of an earbud speaker of an earbud of the headphone system and a headphone speaker of the headphone. In such an example, the mute control can be actuatable responsive to a mute signal. As explained, an SDK, one or more APIs, etc., can be utilized to control one or more functions of a headphone system. For example, the mute control may be actuated responsive to one or more triggers that cause issuance of the mute signal.

As an example, a headphone system can include an earbud socket that includes a release actuator that releases an earbud from the earbud socket. As an example, a release actuator may provide for mechanical and/or magnetic release of an earbud. For example, an earbud may be magnetically coupled to a headphone for seating in an earbud socket. In such an example, a magnet coupling mechanism may involve establishing a magnetic attraction force with one or more components of an earbud (e.g., ferromagnetic, etc.). For example, consider a magnet of a speaker driver providing for a magnetic attraction force to retain an earbud in an earbud socket.

As an example, an earbud socket of a headphone can include an aperture that aligns with an opening of an earbud speaker. In such an example, the headphone can include an acoustic waveguide in fluid communication with the aperture. For example, consider an acoustic waveguide that has a length and cross-sectional area tailored for one or more ranges of frequencies emitted by the earbud speaker. In such an example, sound emitted by the earbud speaker may be preserved, enhanced, etc. (e.g., consider low frequency (bass) enhancement and/or voice enhancement).

As an example, a headphone system can include an earbud that includes a microphone where an earbud socket of a headphone of the headphone system includes a passage that aligns with the microphone where the passage extends to an exterior of the headphone. In such an example, the microphone can receive sound waves from an exterior environment while the earbud is seated in the earbud socket of the headphone. For example, consider sound waves as emitted by a wearer of the headphone such that voice commands, voice communication, etc., can be achieved while the earbud is seated in the earbud socket and the headphone system is fit to a head of the wearer with the headphone covering at least a portion of an ear of the wearer.

As an example, a method can include receiving a first audio signal by a headphone that includes an earbud socket; generating first acoustic waves responsive to receipt of the first audio signal; receiving a second audio signal by an earbud disposed in the earbud socket; and generating second acoustic waves responsive to receipt of the second audio signal. In such an example, the generating the first acoustic waves and the generating the second acoustic waves may occur, at least in part, simultaneously.

As an example, a method can include removing an earbud from an earbud socket of a headphone and inserting the earbud into an ear of a user.

As an example, a method can include responsive to receiving of a second audio signal, reducing volume of first acoustic waves associated with a first audio signal.

As an example, a second audio signal can be or include a cellular device signal, for example, generated by a cellular device wirelessly coupled to an earbud.

As an example, a first audio signal can be or include a device signal generated by a device coupled to a headphone via a wired connection. As an example, a first audio signal can be or include a device signal generated by a device coupled to a headphone via a wireless connection.

As an example, a first audio signal and a second audio signal can be generated by a first device and a second device. In such an example, the first device can be a computing device executing a game application and the second device can be a smartphone (e.g., a cellular phone).

As an example, a method can include receiving a first audio signal by a headphone that includes an earbud socket; generating first acoustic waves responsive to receipt of the first audio signal; receiving a second audio signal by an earbud disposed in the earbud socket; and generating second acoustic waves responsive to receipt of the second audio signal, where such a method may include receiving a voice command via an earbud microphone of the earbud and, responsive to the receiving of the voice command, controlling one or more of generating of the first acoustic waves and the generating of second acoustic waves.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 11:
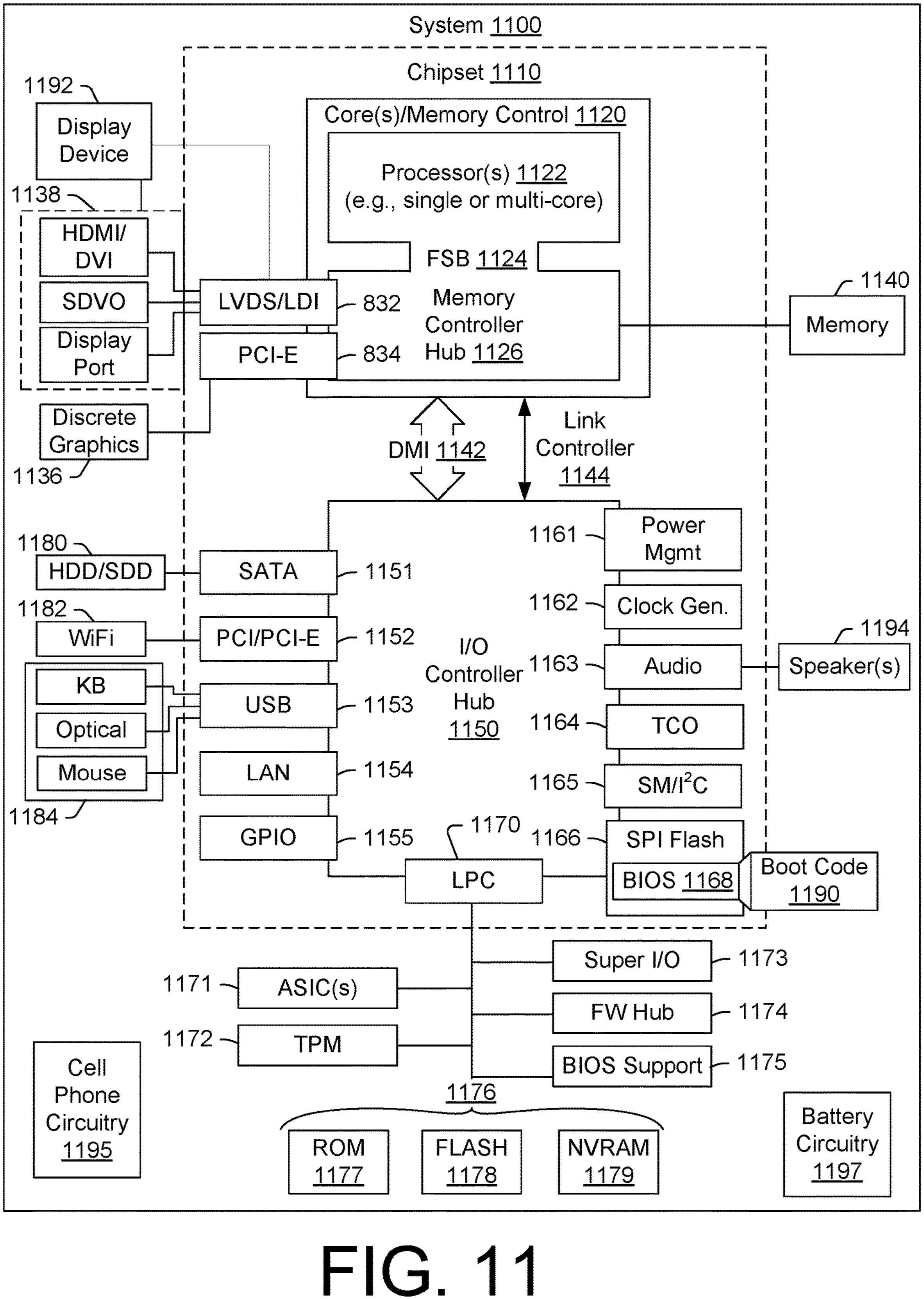
FIG. 11 is a diagram of an example of a system that includes one or more processors.

While various examples of circuits or circuitry have been discussed, FIG. 11 depicts a block diagram of an illustrative computer system 1100. The system 1100 may be a desktop computer system, such as one of the THINKCENTRE® or THINKPAD® series of personal computers sold by Lenovo (US) Inc. of Morrisville, NC, or a workstation computer, such as the THINKSTATION®, which are sold by Lenovo (US) Inc. of Morrisville, NC; however, as apparent from the description herein, a satellite, a base, a server or other machine may include other features or only some of the features of the system 1100. As described herein, a headphone system, such as, for example, the headphone system 100, may include at least some of the features of the system 1100.

As shown in FIG. 11, the system 1100 includes a so-called chipset 1110. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a “northbridge” and a “southbridge”).

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional “northbridge” style architecture.

The memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as “system memory”.

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). A block 1138 includes some examples of technologies that may be supported via the LVDS interface 1132 (e.g., serial digital video, HDMI/DVI, display port). The memory controller hub 1126 also includes one or more PCI-express interfaces (PCI-E) 1134, for example, for support of discrete graphics 1136. Discrete graphics using a PCI-E interface has become an alternative approach to an accelerated graphics port (AGP). For example, the memory controller hub 1126 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1150 includes a variety of interfaces. The example of FIG. 11 includes a SATA interface 1151, one or more PCI-E interfaces 1152 (optionally one or more legacy PCI interfaces), one or more USB interfaces 1153, a LAN interface 1154 (more generally a network interface), a general purpose I/O interface (GPIO) 1155, a low-pin count (LPC) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O hub controller 1150 may include integrated gigabit Ethernet controller lines multiplexed with a PCI-E interface port. Other network features may operate independent of a PCI-E interface.

The interfaces of the I/O hub controller 1150 provide for communication with various devices, networks, etc. For example, the SATA interface 1151 provides for reading, writing or reading and writing information on one or more drives 1180 such as HDDs, SDDs or a combination thereof. The I/O hub controller 1150 may also include an advanced host controller interface (AHCI) to support one or more drives 1180. The PCI-E interface 1152 allows for wireless connections 1182 to devices, networks, etc. The USB interface 1153 provides for input devices 1184 such as keyboards (KB), one or more optical sensors, mice and various other devices (e.g., microphones, cameras, phones, storage, media players, etc.). On or more other types of sensors may optionally rely on the USB interface 1153 or another interface (e.g., $I^2C$, etc.). As to microphones, the system 1100 of FIG. 11 may include hardware (e.g., audio card) appropriately configured for receipt of sound (e.g., user voice, ambient sound, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and non-volatile RAM (NVRAM) 1179. With respect to the TPM 1172, this module may be in the form of a chip that can be used to authenticate software and hardware devices. For example, a TPM may be capable of performing platform authentication and may be used to verify that a system seeking access is the expected system.

The system 1100, upon power on, may be configured to execute boot code 1190 for the BIOS 1168, as stored within the SPI Flash 1166, and thereafter processes data under the control of one or more operating systems and application software (e.g., stored in system memory 1140). An operating system may be stored in any of a variety of locations and accessed, for example, according to instructions of the BIOS 1168. Again, as described herein, a satellite, a base, a server or other machine may include fewer or more features than shown in the system 1100 of FIG. 11. Further, the system 1100 of FIG. 11 is shown as optionally include cell phone circuitry 1195, which may include GSM, CDMA, etc., types of circuitry configured for coordinated operation with one or more of the other features of the system 1100. Also shown in FIG. 11 is battery circuitry 1197, which may provide one or more battery, power, etc., associated features (e.g., optionally to instruct one or more other components of the system 1100). As an example, a SMBus may be operable via a LPC (see, e.g., the LPC interface 1170), via an $I^2C$ interface (see, e.g., the SM/$I^2C$ interface 1165), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A headphone system comprising:

an earbud that comprises an earbud speaker, earbud communication circuitry and earbud power circuitry; and a headphone that comprises a headphone speaker, an ear cushion, a headband, headphone communication circuitry, headphone power circuitry and an earbud socket that removably receives the earbud, wherein the earbud comprises earbud audio canceling circuitry actuatable to cancel audio emitted by the headphone speaker, and wherein the earbud audio canceling circuitry is actuatable responsive to a call signal from a cellular communication device.

2. The headphone system of claim 1, wherein the earbud power circuitry comprises an electrical power reception contact and wherein the earbud socket comprises an electrical power transmission contact that mates with the electrical power reception contact wherein the earbud is received in the earbud socket.

3. The headphone system of claim 1, wherein the earbud comprises a right ear earbud or a left ear earbud and wherein the headphone comprises an ambidextrous headphone.

4. The headphone system of claim 1, wherein the earbud comprises a right ear earbud or a left ear earbud and wherein the headphone comprises a left ear headphone or a right ear headphone.

5. The headphone system of claim 1, wherein the earbud comprises a first earbud and further comprising a second earbud, wherein the headphone comprises a first headphone and further comprising a second headphone, wherein the second headphone is coupled to the headband, wherein the earbud socket is a first earbud socket for the first earbud, and wherein the second headphone comprises a second earbud socket for the second earbud.

6. The headphone system of claim 1, wherein the earbud communication circuitry and the headphone communication circuitry are independently operable to receive earbud audio signals and headphone audio signals.

7. The headphone system of claim 1, wherein the earbud comprises earbud volume control circuitry and wherein the headphone comprises headphone volume control circuitry.

8. The headphone system of claim 1, wherein the headphone comprises headphone audio canceling circuitry actuatable to cancel audio emitted by the earbud speaker.

9. The headphone system of claim 1, wherein the earbud comprises an earbud microphone and wherein the earbud socket removably receives the earbud to acoustically isolate the earbud microphone from the earbud speaker.

10. The headphone system of claim 9, wherein the earbud socket receives the earbud to acoustically isolate the earbud microphone from the headphone speaker.

11. The headphone system of claim 1, wherein the headphone comprises a mute control actuatable to mute one or more of the earbud speaker and the headphone speaker, wherein the mute control is actuatable responsive to a mute signal.

12. The headphone system of claim 1, wherein the earbud socket comprises a release actuator that releases the earbud from the earbud socket.

13. The headphone system of claim 1, wherein the earbud comprises a microphone and wherein the earbud socket comprises a passage that aligns with the microphone, wherein the passage extends to an exterior of the headphone.

14. A headphone system comprising:

an earbud that comprises an earbud speaker, earbud communication circuitry and earbud power circuitry; and a headphone that comprises a headphone speaker, an ear cushion, a headband, headphone communication circuitry, headphone power circuitry and an earbud socket that removably receives the earbud, wherein the headphone comprises headphone audio canceling circuitry actuatable to cancel audio emitted by the earbud speaker.

15. The headphone system of claim 14, wherein the earbud comprises a first earbud and further comprising a second earbud, wherein the headphone comprises a first headphone and further comprising a second headphone, wherein the second headphone is coupled to the headband, wherein the earbud socket is a first earbud socket for the first earbud, and wherein the second headphone comprises a second earbud socket for the second earbud.

16. The headphone system of claim 14, wherein the earbud communication circuitry and the headphone communication circuitry are independently operable to receive earbud audio signals and headphone audio signals.

17. The headphone system of claim 14, wherein the earbud comprises earbud volume control circuitry and wherein the headphone comprises headphone volume control circuitry.

18. A headphone system comprising:

an earbud that comprises an earbud speaker, earbud communication circuitry and earbud power circuitry; and a headphone that comprises a headphone speaker, an ear cushion, a headband, headphone communication circuitry, headphone power circuitry and an earbud socket that removably receives the earbud, wherein the earbud comprises a microphone and wherein the earbud socket comprises a passage that aligns with the microphone, wherein the passage extends to an exterior of the headphone.

19. The headphone system of claim 18, wherein the earbud comprises a first earbud and further comprising a second earbud, wherein the headphone comprises a first headphone and further comprising a second headphone, wherein the second headphone is coupled to the headband, wherein the earbud socket is a first earbud socket for the first earbud, and wherein the second headphone comprises a second earbud socket for the second earbud.

20. The headphone system of claim 18, wherein the earbud communication circuitry and the headphone communication circuitry are independently operable to receive earbud audio signals and headphone audio signals.

* * * * *